(12) United States Patent
Broomhall et al.

(10) Patent No.: US 10,552,991 B2
(45) Date of Patent: Feb. 4, 2020

(54) VISUALLY SHOWING HOW RECENTLY A CHANGE WAS MADE TO A DOCUMENT BY USING COLOR INTENSITY AND/OR TYPEFACE AND/OR FONT AND/OR EMPHASIS

(71) Applicant: INTERNATIONAL BUSINESS MACHINES CORPORATION, Armonk, NY (US)

(72) Inventors: Matthew E. Broomhall, Goffstown, NH (US); Christopher R. Dotson, Lexington, KY (US); Fabrizio N. Caldas, Sumaré (BR); Michael R. Spano, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 14/755,836

(22) Filed: Jun. 30, 2015

(65) Prior Publication Data
US 2017/0004118 A1    Jan. 5, 2017

(51) Int. Cl.
*G06F 17/20*    (2006.01)
*G06T 11/00*    (2006.01)

(52) U.S. Cl.
CPC .................. *G06T 11/001* (2013.01)

(58) Field of Classification Search
CPC .. G06F 17/2211; G06F 17/211; G06T 11/001; G06T 11/206
See application file for complete search history.

(56) References Cited

U.S. PATENT DOCUMENTS

| | | | | |
|---|---|---|---|---|
| 8,671,340 | B1* | 3/2014 | Siegel | G06F 17/2247 715/234 |
| 2012/0233137 | A1 | 9/2012 | Jakobson et al. | |
| 2012/0233554 | A1* | 9/2012 | Vagell | G06F 17/2288 715/751 |
| 2014/0195899 | A1 | 7/2014 | Bastide et al. | |
| 2015/0199411 | A1* | 7/2015 | Greenspan | G06F 17/30548 715/229 |
| 2015/0334508 | A1* | 11/2015 | Yang | H04W 4/005 455/412.1 |

FOREIGN PATENT DOCUMENTS

| EP | 1 681 634 A1 | 7/2006 |
|---|---|---|
| EP | 2 354 966 A2 | 8/2011 |

OTHER PUBLICATIONS

Ferrate, Andres, Getting Started with Google Wave, O'Reilly (Year: 2009).*
http://en.wikipedia.org/wiki/Typeface, "Typeface" printed Apr. 8, 2015.
http://en.wikipedia.org/wiki/Font, "Font" printed Apr. 8, 2015.
http://mashable.com/2009/05/28/google-wave-guide/, "Google Wave: A complete Guide" printed Jun. 30, 2015.
http://mashable.com/2009/05/28/google-wave/, "Could Google Wave Redefine Email and Web Communication" printed Jun. 30, 2015.

* cited by examiner

*Primary Examiner* — Shahid K Khan
(74) *Attorney, Agent, or Firm* — Scully, Scott, Murphy & Presser, P.C.; Samuel A. Waldbaum, Esq.

(57) ABSTRACT

The present disclosure relates generally to the field of visually showing how recently a change was made to a document (e.g., using color intensity and/or typeface and/or font and/or emphasis). In various embodiments, systems, methods and computer program products are provided.

20 Claims, 7 Drawing Sheets

300

301 { The majority of the text is "original" text and will be in a default color, such as black, but this change was made by User A10 seconds ago and is therefore high intensity. It won't be visible if the point-in-time dial is turned back to an hour ago. Lorem ipsum dolor sit amet, consecetur adipisicing elit, sed do eiusmod tempor--- This change was made 10 minutes ago. — 301A / 301B 303 { If the dial were turned back to "one hour ago" the it would also not be visible. Lorem ipsum dolor sit amet, consecetur adipisicing elit, sed do eiusmod tempor--- This change was made 100 minutes ago. If the "point in time" dial were turned back to one hour, it would be a much brighter red. Lorem ipsum dolor sit amet, consecetur adipisicing elit, sed do eiusmod tempor--- This change was made 1,000 minutes ago. Although it has not been "accepted" yet, it's no longer flagged as a recent change. — 303A / 303B 305 { The majority of the text is "original" text and will be in a default color, such as black, but this change was made by User B10 seconds ago and is therefore high intensity. It won't be visible if the point-in-time dial is turned back to an hour ago. Lorem ipsum dolor sit amet, consecetur adipisicing elit, sed do eiusmod tempor--- This change was made 10 minutes ago. — 305A / 305B 307 { If the dial were turned back to "one hour ago" the it would also not be visible. Lorem ipsum dolor sit amet, consecetur adipisicing elit, sed do eiusmod tempor--- This change was made 100 minutes ago. If the "point in time" dial were turned back to one hour, it would be a much brighter blue. Lorem ipsum dolor sit amet, consecetur adipisicing elit, sed do eiusmod tempor--- This change was made 1,000 minutes ago. Although it has not been "accepted" yet, it's no longer flagged as a recent change. — 307A / 307B 309 { This change was made by User C10 seconds ago. Using highlights instead of text colors may be more visible in some circumstances — 309A / 309B

FIG. 3

RECEIVING, BY A PROCESSOR, AT LEAST FIRST AND SECOND PARAMETERS FOR CONTROLLING A VISUAL INDICATION OF A REVISION TO THE TEXT, WHEREIN THE FIRST PARAMETER CONTROLS A BASE POINT OF TIME AFTER WHICH THE INDICATION OF THE REVISION TO THE TEXT WILL NOT BE SHOWN AND WHEREIN THE SECOND PARAMETER CONTROLS A TIME SPAN FOR WHICH THE INDICATION OF THE REVISION OF TEXT WILL BE SHOWN
401

↓

RECEIVING, BY THE PROCESSOR, THE REVISION TO THE TEXT
403

↓

RECEIVING, BY THE PROCESSOR, A CURRENT TIME
405

↓

SHOWING, BY THE PROCESSOR, THE VISUAL INDICATION OF THE REVISION TO THE TEXT, WHEREIN THE VISUAL INDICATION OF THE REVISION TO THE TEXT IS BASED UPON THE CURRENT TIME, THE FIRST PARAMETER AND THE SECOND PARAMETER
407

FIG. 4

VISUALLY SHOWING HOW RECENTLY A CHANGE WAS MADE TO A DOCUMENT BY USING COLOR INTENSITY AND/OR TYPEFACE AND/OR FONT AND/OR EMPHASIS

BACKGROUND

The present disclosure relates generally to the field of visually showing how recently a change was made to a document (e.g., using color intensity and/or typeface and/or font and/or emphasis). In various embodiments, systems, methods and computer program products are provided.

When editing a document with revision tracking, it is often the case that so many items are marked for review that it is difficult to see what the recent changes were, and teams of people often do not have the discipline to accept changes regularly (thus, the document typically becomes cluttered with a large number of indicated changes).

SUMMARY

The present disclosure provides for showing, visually, how recently a change had been made to a document. The visual showing may be, for example, by color intensity and/or by typeface and/or by font and/or by emphasis.

In one embodiment, a computer-implemented method for visually showing how recently a change was made to text in a document is provided, the method comprising: receiving, by a processor, at least first and second parameters for controlling a visual indication of a revision to the text, wherein the first parameter controls a base point of time after which the indication of the revision to the text will not be shown and wherein the second parameter controls a time span for which the indication of the revision of text will be shown; receiving, by the processor, the revision to the text; receiving, by the processor, a current time; and showing, by the processor, the visual indication of the revision to the text, wherein the visual indication of the revision to the text is based upon the current time, the first parameter and the second parameter.

In another embodiment, a computer readable storage medium, tangibly embodying a program of instructions executable by the computer for visually showing how recently a change was made to text in a document is provided, the program of instructions, when executing, performing the following steps: receiving at least first and second parameters for controlling a visual indication of a revision to the text, wherein the first parameter controls a base point of time after which the indication of the revision to the text will not be shown and wherein the second parameter controls a time span for which the indication of the revision of text will be shown; receiving the revision to the text; receiving a current time; and showing the visual indication of the revision to the text, wherein the visual indication of the revision to the text is based upon the current time, the first parameter and the second parameter.

In another embodiment, a computer-implemented system for visually showing how recently a change was made to text in a document is provided, the system comprising: a processor; and a memory storing computer readable instructions that, when executed by the processor, implement: a first receiving element configured to receive at least first and second parameters for controlling a visual indication of a revision to the text, wherein the first parameter controls a base point of time after which the indication of the revision to the text will not be shown and wherein the second parameter controls a time span for which the indication of the revision of text will be shown; a second receiving element configured to receive the revision to the text; a third receiving element configured to receive a current time; and a showing element configured to show the visual indication of the revision to the text, wherein the visual indication of the revision to the text is based upon the current time, the first parameter and the second parameter.

BRIEF DESCRIPTION OF THE DRAWINGS

Various objects, features and advantages of the present invention will become apparent to one skilled in the art, in view of the following detailed description taken in combination with the attached drawings, in which:

FIG. 3 depicts a diagram showing an example visual display of text in a document according to an embodiment.

FIG. 4 depicts a flowchart of a method according to an embodiment.

DETAILED DESCRIPTION

In one example, one or more systems may provide for visually showing how recently a change was made to a document by using color intensity and/or typeface and/or font and/or emphasis. In another example, one or more methods may provide for visually showing how recently a change was made to a document by using color intensity and/or typeface and/or font and/or emphasis. In another example, one or more algorithms may provide for visually showing how recently a change was made to a document by using color intensity and/or typeface and/or font and/or emphasis.

In one specific example, if the original text is black, User A's revisions might be in red, User B's revisions might be in green, and User C's revisions might be in blue. In this specific example, bright red text would indicate a recent change by User A. One hour after the change was made, this text (which had been revised by User A) may fade to 75% red and 25% black. One day later, the text (which had been revised by User A) might be 50% red and 50% black. After one week, the text (which had been revised by User A) may be noted by a very slight reddish hue, or may even be completely black. In other examples, the visual showing may be by typeface and/or font and/or emphasis.

For the purposes of this disclosure the term "document" is intended to refer to an editable computer file. In various examples, such a computer file may be a word proceeding document, a slide presentation a spreadsheet, a webpage, a wiki, or a blog.

For the purposes of this disclosure the term "typeface" is intended to refer to one or more fonts, each comprising glyphs that share a common design feature. One example of a typeface is "Times New Roman". Another example of a typeface is "Arial".

For the purposes of this disclosure the term "font" is intended to refer to a particular size, weight and style of a typeface. One example of a font is "Times New Roman" having a 12 point size. Another example of a font is "Times New Roman" having a 14 point size. Another example of a font is "Times New Roman" being in italic form. Another example of a font is "Times New Roman" being in bold form.

For the purposes of this disclosure the term "emphasis" is intended to refer to a mechanism for directing attention to text. One example of such emphasis is underlining text. Another example of such emphasis is highlighting text (such as with a background color that differs from the dominant background color of the document).

Figure 1:
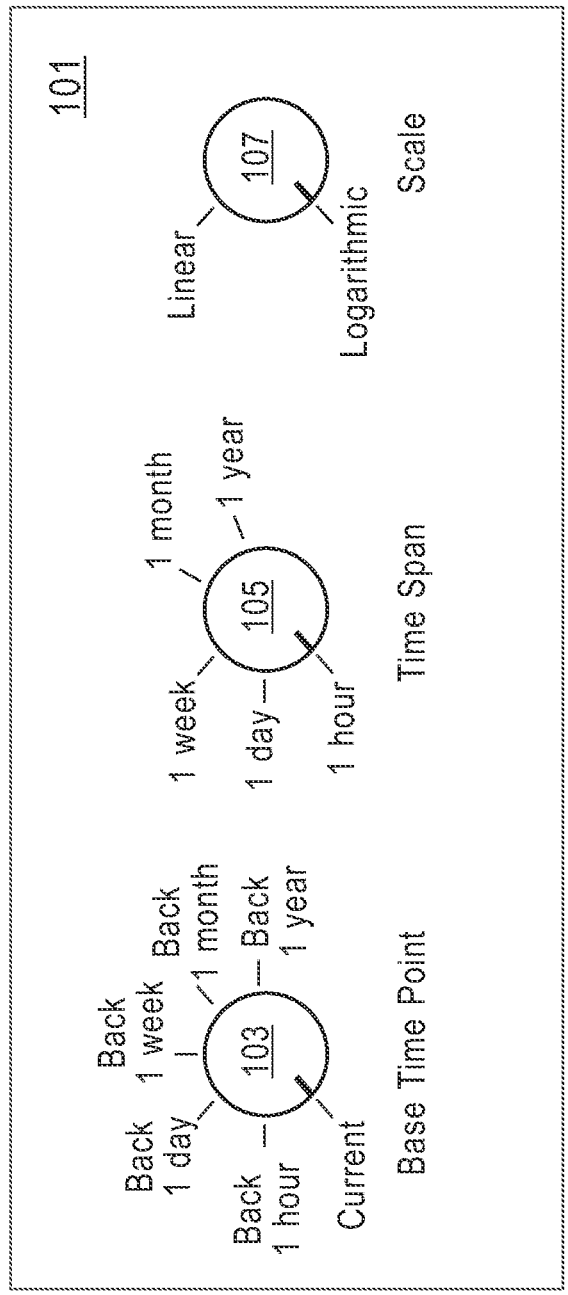
FIG. 1 depicts a diagram showing one example graphical user interface ("GUI") according to an embodiment.
Figure 2:
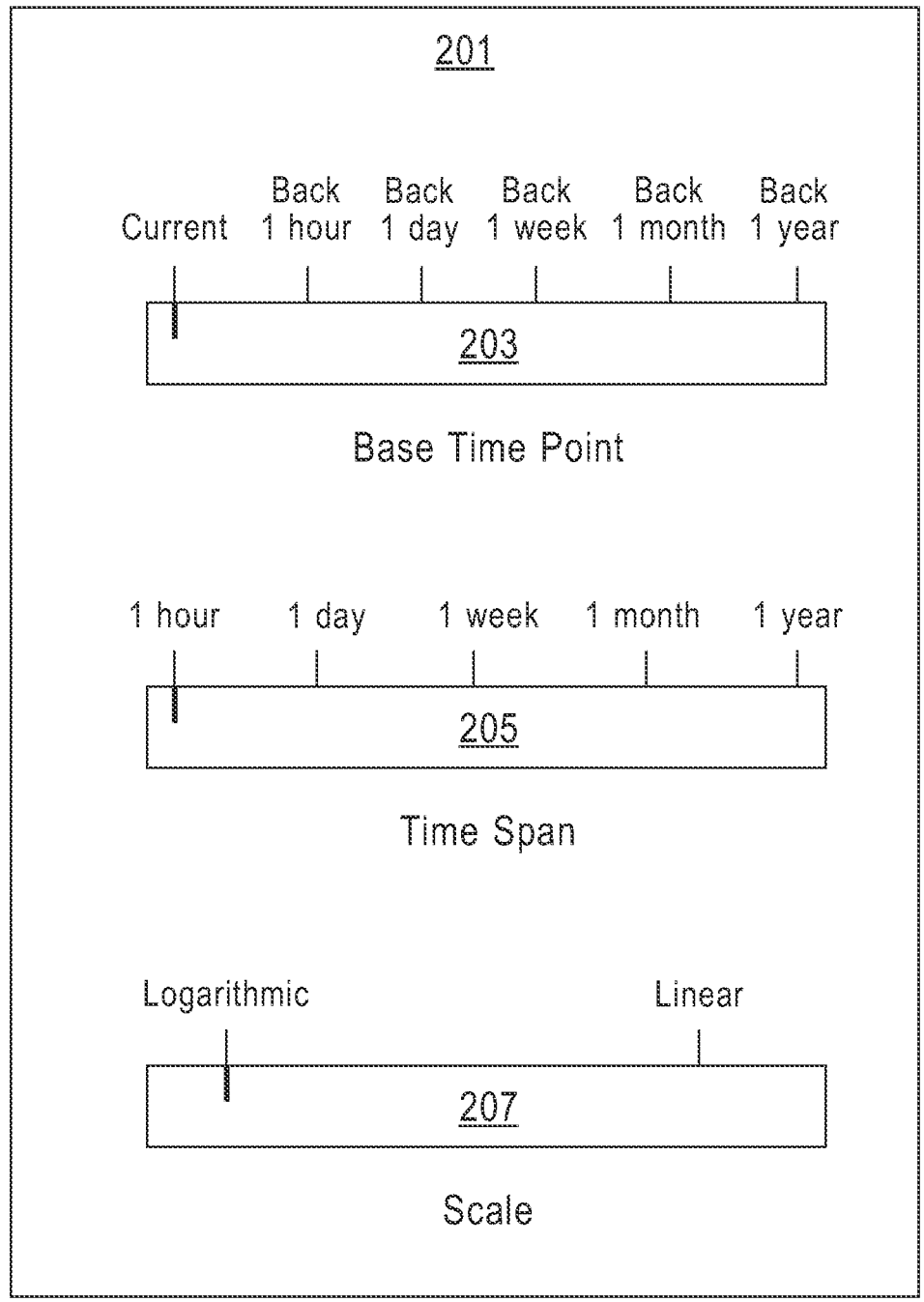
FIG. 2 depicts a diagram showing another example graphical user interface ("GUI") according to an embodiment.

Reference will now be made to an embodiment of the present disclosure. In this regard, the visual indication of recent changes may be controlled by a number of parameters (e.g., that the user sets). In one example, the parameters may be input via controls provided in a graphical user interface ("GUI"). In one specific example, the input may be provided via GUI "dials" (see example GUI 101 of FIG. 1 showing "Base Time Point" dial 103, "Time Span" dial 105 and "Scale" dial 107). In another specific example, the input may be provided by GUI "sliders" (see example GUI 201 of FIG. 2 showing "Base Time Point" slider 203, "Time Span" slider 205 and "Scale" slider 207). Of course, any other desired form of input controls may be used to receive the user input.

Referring now again to FIGS. 1 and 2, one parameter (which may be set by a user, for example, via use of dial 103 of GUI 101 or dial 203 of GUI 201) would be the base time point. In one specific example, a default base time point would be the present (or current) time, such that the user sees changes indicated (such as by color intensity and/or typeface and/or font and/or emphasis) from the perspective of the present. However, if inspecting a document that has not changed, for example, in a week, the user may want to set the baseline of changes for "one week ago" (by moving the "Base Time Point" dial 103 to "Back 1 Week" if using GUI 101 or by moving the "Base Time Point" slider 203 to "Back 1 Week" if using GUI 201). Changes after this base time point would not be shown (similar to Google Wave), and changes before this base time point would be coded (such as by color intensity and/or typeface and/or font and/or emphasis) depending upon how long it had been since the changes were made.

Still referring to FIGS. 1 and 2, another parameter (which may be set by a user, for example, via use of dial 105 of GUI 101 or dial 205 of GUI 201) would be the time span (or length of time) over which to indicate change history. For example, by moving the "Time Span" dial 105 to "1 Hour" (if using GUI 101) or by moving the "Time Span" slider 205 to "1 Hour" (if using GUI 201) only very recent changes would be indicated and, after a short time (e.g., one hour in this example) the changes would no longer be visible. In this regard, a short (or low) setting may be used to better facilitate real-time group editing of a document. On the other hand, changing this parameter to a long (or high) setting will show changes for a longer period of time (e.g., the change might be at 50% intensity after two weeks and back to the original color after one month).

Of course, while FIGS. 1 and 2 depict various example parameters (such as hour, day, week, month, year) any desired times may be used. In addition, in another example, the parameters may be set with relative settings such as "low", "medium", "high" or "short", "long", "very long".

Still referring to FIGS. 1 and 2, a third parameter (which may be set by a user, for example, via use of dial 107 of GUI 101 or dial 207 of GUI 201) would be the type of scale to use for the indication of changes to the document. For example, by moving the "Scale" dial 107 to "Logarithmic" (if using GUI 101) or by moving the "Scale" slider 207 to "Logarithmic" (if using GUI 201) the color intensity and/or typeface and/or font and/or emphasis would be controlled using a logarithmic scale. On the other hand, by moving the "Scale" dial 107 to "Linear" (if using GUI 101) or by moving the "Scale" slider 207 to "Linear" (if using GUI 201) the color intensity and/or typeface and/or font and/or emphasis would be controlled using a linear scale. Of course, in other examples, any other desired type of scale may be utilized. Further, in yet another example, the type of scale is not user-settable (but, rather, set by the system).

Referring now to FIG. 3, a diagram showing an example visual display of text in a document 300 according to an embodiment is shown. As seen in the example of this FIG. 3, original text will be in a default color, such as black against a lighter color background. Further, various text will be displayed in an encoded manner using color intensity and emphasis as described herein. In one example, each user has a base "change color" (e.g., red, blue or green) and that color fades back to the default (e.g., black) over time as the changes age.

Still referring to the example of FIG. 3, paragraph 301 relates to User A. Text 301A indicates a change made 10 seconds ago and text 301B indicates a change made 10 minutes ago (note the difference in intensity). Further, paragraph 303 relates to User A. Text 303A indicates a change made 100 minutes ago and non-colored text 303B has a change that was made 1,000 minutes ago.

Still referring to the example of FIG. 3, paragraph 305 relates to User B. Text 305A indicates a change made 10 seconds ago and text 305B indicates a change made 10 minutes ago (note the difference in intensity). Further, paragraph 307 relates to User B. Text 307A indicates a change made 100 minutes ago and non-colored text 307B has a change that was made 1,000 minutes ago.

Still referring to the example of FIG. 3, paragraph 309 relates to User C. Highlighted text 309A indicates a change made 10 seconds ago and highlighted text 309B indicates an older change by User C (note the use of block style highlighting with respect to User C).

In another example, an indication of how recently a change had been made may be presented visually by more/less bold or more/less italic.

Figure 7:
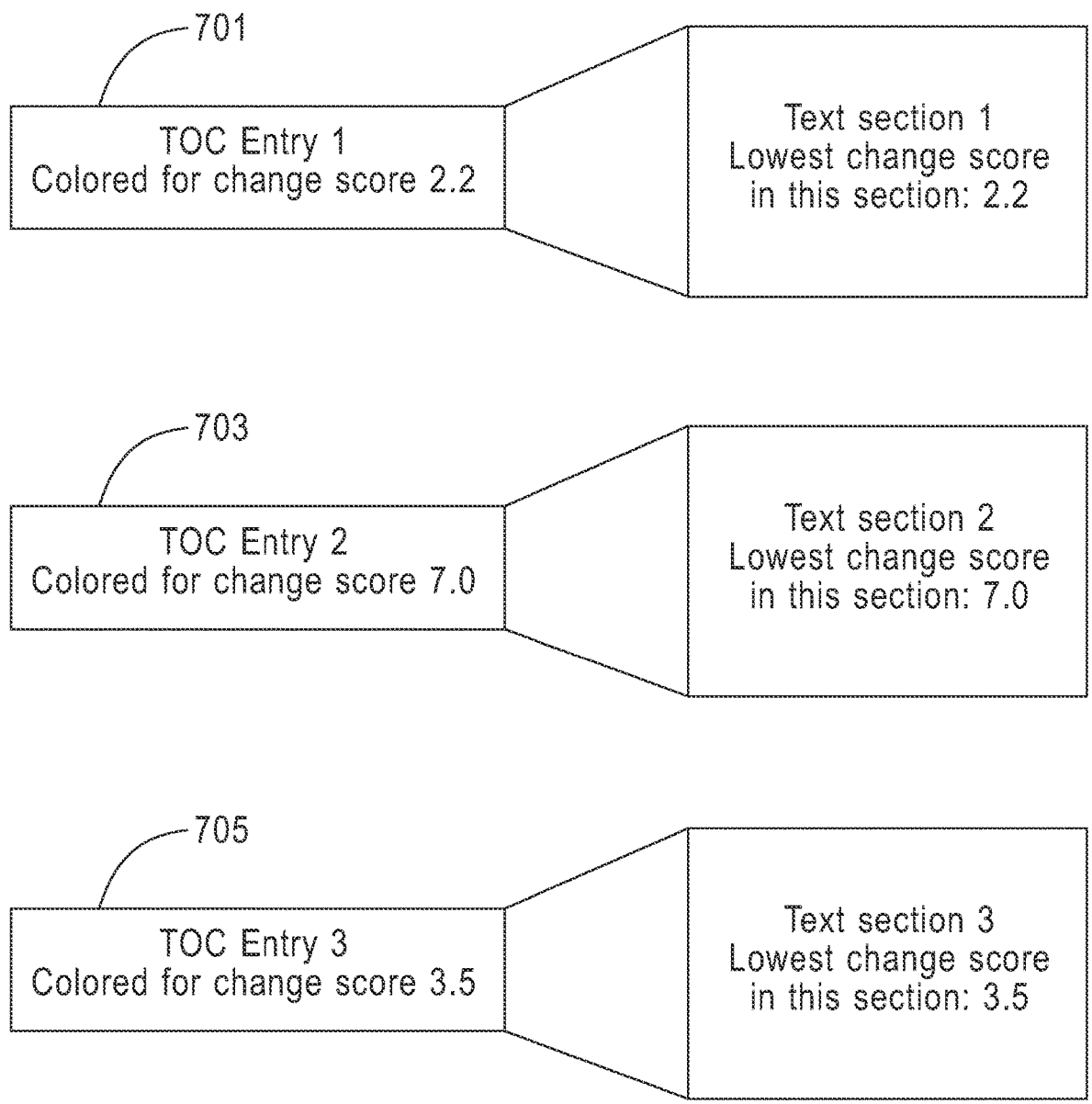
FIG. 7 depicts an example schematic diagram of a "heat map" according to an embodiment.

In another example, a "heat map" table of contents may be provided. In one specific example, such a "heat map" table of contents may be automatically generated, coded (e.g., using color and/or typeface and/or font and/or emphasis) similarly to the inline text (that is, the text in the document), and faded over time similarly to the inline text. FIG. 7 depicts an example schematic diagram of such a "heat map" according to an embodiment. As seen, given a table of contents (having, for example, Table of Contents Entry 1 (call-out number 701), Table of Contents Entry 2 (call-out number 703) and Table of Contents Entry (call-out number 705)) with links to the different sections of text in the main document, the system can color-code each entry in the table of contents with the color from the lowest change time score found within the changes.

Referring now to FIG. 4, a method for visually showing how recently a change was made to text in a document is shown. As seen in this FIG. 4, the method of this embodiment comprises: at 401—receiving, by a processor, at least first and second parameters for controlling a visual indication of a revision to the text, wherein the first parameter controls a base point of time after which the indication of the revision to the text will not be shown and wherein the second parameter controls a time span for which the indication of the revision of text will be shown; at 403—receiving, by the processor, the revision to the text; at 405—receiving, by the processor, a current time; and at 407—showing, by the processor, the visual indication of the revision to the text, wherein the visual indication of the revision to the text is based upon the current time, the first parameter and the second parameter.

In one example, for each change in the document: (a) calculate the change time offset-subtract the timestamp of the change from the "base time point" setting to obtain the change time offset (for example, if today is May 28, the "base time point" setting was "back one week", and the date of the change was May 14, then the base time point is May 21 and the change time offset is 7 days (May 21-May 7)); (b) calculate the change time score—divide the change time offset by the "time span" setting (for example, if the change time offset is 7 days and the time span setting is "1 day", then 7/1=7.0; (c) after calculating the change time score for each change, construct a table of colors or highlights based on the change time scores and the "scale" setting (for example, if the scale setting were "linear", the change time scores ranged from 0 to 10, and the system had 10 colors or highlights, then the system would assign color 1 to scores 0-1, color 2 to scores 1-2, etc; as a second example, if the scale setting were "logarithmic", the change time scores ranged from 0 to 10000000, and the system had 7 colors or highlights, the system would assign color 1 to scores 0-10, color 2 to scores 11-100, color 3 to scores 101-1000, etc.).

Figure 5:
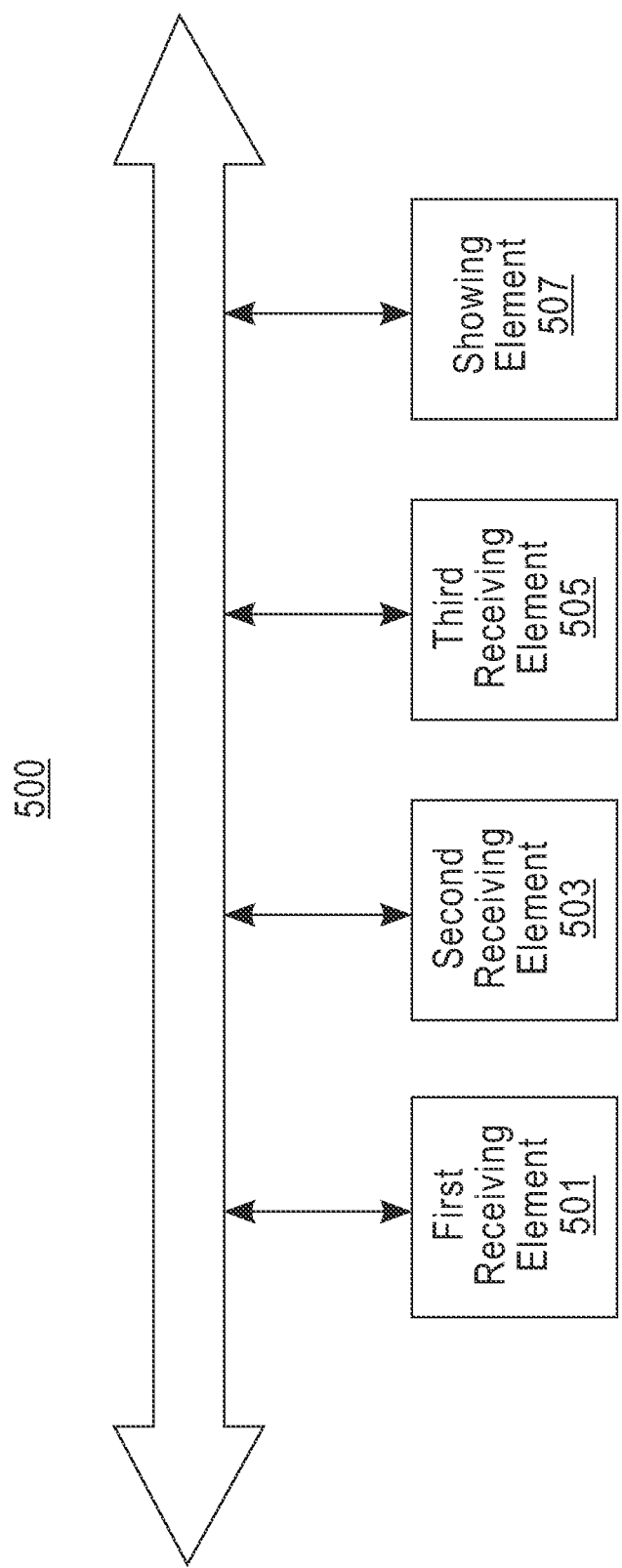
FIG. 5 depicts a block diagram of a system according to an embodiment.

Referring now to FIG. 5, in another embodiment, a system 500 for visually showing how recently a change was made to text in a document is provided. This system may include a processor (not shown); and a memory (not shown) storing computer readable instructions that, when executed by the processor, implement: a first receiving element 501 configured to receive at least first and second parameters for controlling a visual indication of a revision to the text, wherein the first parameter controls a base point of time after which the indication of the revision to the text will not be shown and wherein the second parameter controls a time span for which the indication of the revision of text will be shown; a second receiving element 503 configured to receive the revision to the text; a third receiving element 505 configured to receive a current time; and a showing element 507 configured to show the visual indication of the revision to the text, wherein the visual indication of the revision to the text is based upon the current time, the first parameter and the second parameter.

In one example, communication between and among the various components of FIG. 5 may be bi-directional. In another example, the communication may be carried out via the Internet, an intranet, a local area network, a wide area network and/or any other desired communication channel(s). In another example, each of the components may be operatively connected to each of the other components. In another example, some or all of these components may be implemented in a computer system of the type shown in FIG. 6.

Figure 6:
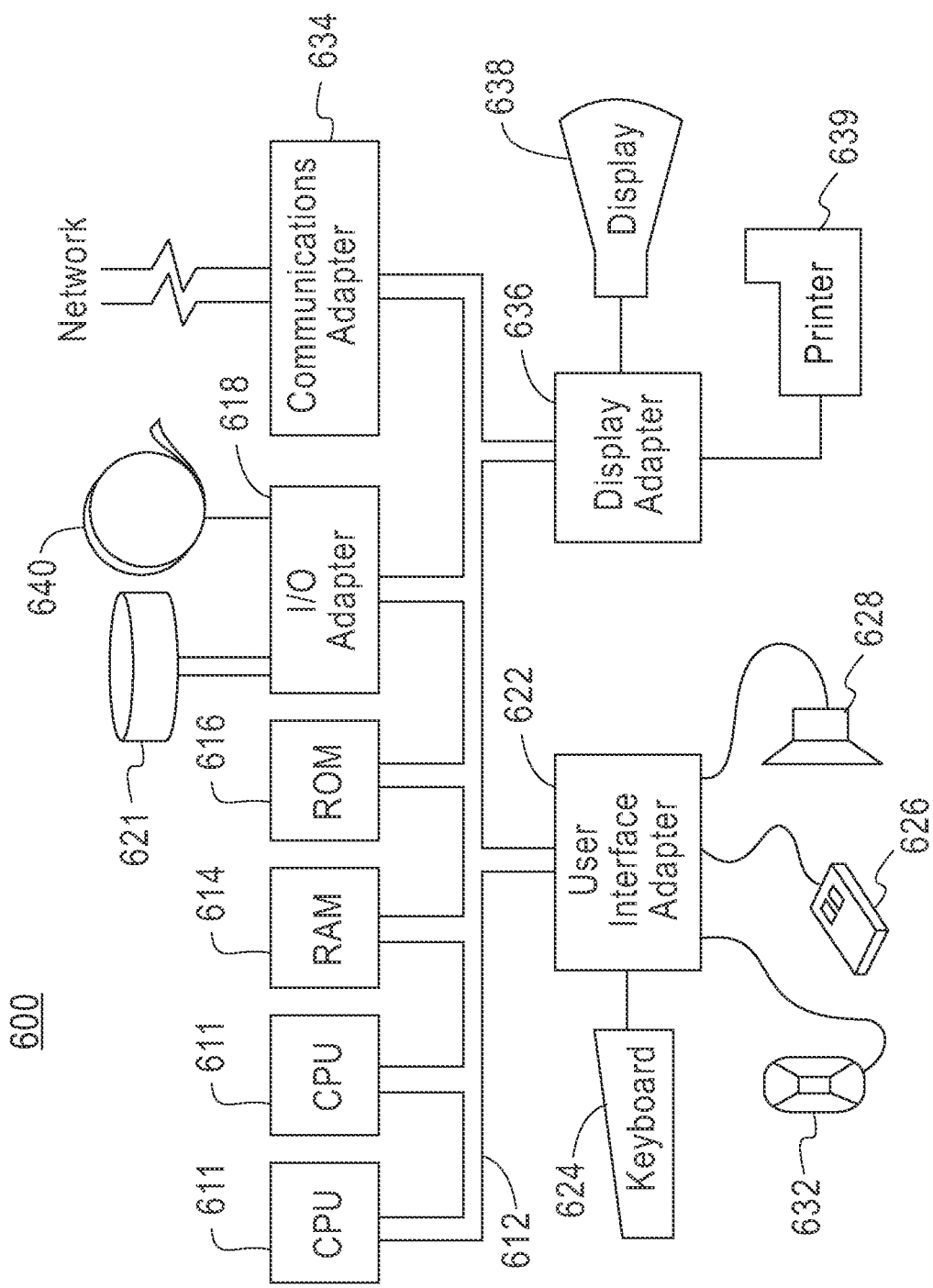
FIG. 6 depicts a block diagram of a system according to an embodiment.

Referring now to FIG. 6, this figure shows a hardware configuration of computing system 600 according to an embodiment of the present invention. As seen, this hardware configuration has at least one processor or central processing unit (CPU) 611. The CPUs 611 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), a communications adapter 634 for connecting the system 600 to a data processing network, the Internet, an Intranet, a local area network (LAN), etc., and a display adapter 636 for connecting the bus 612 to a display device 638 and/or printer 639 (e.g., a digital printer or the like).

As described herein, various embodiments may be used in the context of collaborative editing, wikis and blogs.

In another example, it is noted that track changes typically color codes by author rather than by change duration. The features described herein could be an option for "track change" to also or only display by most recent change. It could be used, for example, in MICROSOFT WORD or an online collaborative editing system like GOOGLE DOCS.

In one embodiment, a computer-implemented method for visually showing how recently a change was made to text in a document is provided, the method comprising: receiving, by a processor, at least first and second parameters for controlling a visual indication of a revision to the text, wherein the first parameter controls a base point of time after which the indication of the revision to the text will not be shown and wherein the second parameter controls a time span for which the indication of the revision of text will be shown; receiving, by the processor, the revision to the text; receiving, by the processor, a current time; and showing, by the processor, the visual indication of the revision to the text, wherein the visual indication of the revision to the text is based upon the current time, the first parameter and the second parameter.

In one example, the method further comprises showing, by the processor, the text in an original state, wherein the text is shown in the original state prior to the showing of the visual indication of the revision to the text.

In another example, the method further comprises receiving, by the processor, at least the first and second parameters from a user.

In another example, the at least first and second parameters are received from the user via a graphical user interface operated by the user.

In another example: the text shown in the original state is shown in a first color; the revision to the original text is shown in a second color that is different from the first color; and the revision to the original text is shown in the second color in an intensity that varies depending upon how recently the revision to the original text had been made.

In another example: the text shown in the original state is shown in a font having a first weight; the revision to the original text is shown in the font having a second weight that is different from the first weight; and the second weight is varied depending upon how recently the revision to the original text had been made.

In another example: the text shown in the original state is shown in a font having no emphasis; the revision to the original text is shown in the font having an emphasis; and the emphasis is varied depending upon how recently the revision to the original text had been made.

In another embodiment, a computer readable storage medium, tangibly embodying a program of instructions executable by the computer for visually showing how recently a change was made to text in a document is provided, the program of instructions, when executing, performing the following steps: receiving at least first and second parameters for controlling a visual indication of a revision to the text, wherein the first parameter controls a base point of time after which the indication of the revision to the text will not be shown and wherein the second parameter controls a time span for which the indication of the revision of text will be shown; receiving the revision to the text; receiving a current time; and showing the visual indication of the revision to the text, wherein the visual indication of the revision to the text is based upon the current time, the first parameter and the second parameter.

In one example, the program of instructions, when executing, further performs showing the text in an original state, wherein the text is shown in the original state prior to the showing of the visual indication of the revision to the text.

In another example, the program of instructions, when executing, further performs receiving at least the first and second parameters from a user.

In another example, the at least first and second parameters are received from the user via a graphical user interface operated by the user.

In another example: the text shown in the original state is shown in a first color; the revision to the original text is shown in a second color that is different from the first color; and the revision to the original text is shown in the second color in an intensity that varies depending upon how recently the revision to the original text had been made.

In another example: the text shown in the original state is shown in a font having a first weight; the revision to the original text is shown in the font having a second weight that is different from the first weight; and the second weight is varied depending upon how recently the revision to the original text had been made.

In another example: the text shown in the original state is shown in a font having no emphasis; the revision to the original text is shown in the font having an emphasis; and the emphasis is varied depending upon how recently the revision to the original text had been made.

In another embodiment, a computer-implemented system for visually showing how recently a change was made to text in a document is provided, the system comprising: a processor; and a memory storing computer readable instructions that, when executed by the processor, implement: a first receiving element configured to receive at least first and second parameters for controlling a visual indication of a revision to the text, wherein the first parameter controls a base point of time after which the indication of the revision to the text will not be shown and wherein the second parameter controls a time span for which the indication of the revision of text will be shown; a second receiving element configured to receive the revision to the text; a third receiving element configured to receive a current time; and a showing element configured to show the visual indication of the revision to the text, wherein the visual indication of the revision to the text is based upon the current time, the first parameter and the second parameter.

In one example, the computer readable instructions, when executed by the processor, implement showing the text in an original state, wherein the text is shown in the original state prior to the showing of the visual indication of the revision to the text.

In another example, the computer readable instructions, when executed by the processor, implement receiving at least the first and second parameters from a user, wherein the at least first and second parameters are received from the user via a graphical user interface operated by the user.

In another example: the text shown in the original state is shown in a first color; the revision to the original text is shown in a second color that is different from the first color; and the revision to the original text is shown in the second color in an intensity that varies depending upon how recently the revision to the original text had been made.

In another example: the text shown in the original state is shown in a font having a first weight; the revision to the original text is shown in the font having a second weight that is different from the first weight; and the second weight is varied depending upon how recently the revision to the original text had been made.

In another example: the text shown in the original state is shown in a font having no emphasis; the revision to the original text is shown in the font having an emphasis; and the emphasis is varied depending upon how recently the revision to the original text had been made.

In other examples, any steps described herein may be carried out in any appropriate desired order.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for visually showing how recently a change was made to text in a document, the method comprising:
   receiving, by a processor, a first parameter indicating a user-adjustable base point of time, wherein the base point of time is adjustable among a value indicating current time and a plurality of values indicating times before the current time;
   receiving, by a processor, a second parameter indicating a time span;
   receiving, by the processor, at least one completed revision to the text that was made prior to the current time indicated by the value and prior to the base point of time indicated by the first parameter;
   receiving, by the processor, the value indicating current time;
   showing, by the processor, visual indication of the at least one completed revision to the text starting from the current time and for a duration indicated by the time span of the second parameter, wherein completed revisions made after the base point of time, and prior to the current time, will not be shown, and the at least one completed revision made prior to the base point of time will be shown, using the visual indication, within the time span, the visual indication of the at least one completed revision to the text is based upon the current time, the first parameter and the second parameter; and
   generating a heat map table of contents for the document, the heat map table of contents comprising a respective plurality of entries each associated with a corresponding section of text from the document, at least one entry of the respective plurality of entries being coded based upon a most recent time at which any completed revision of the at least one completed revision was made within the corresponding section of text.

2. The method of claim 1, further comprising showing, by the processor, the text in an original state, wherein the text is shown in the original state prior to the showing of the visual indication of the at least one completed revision to the text.

3. The method of claim 1, further comprising receiving, by the processor, at least the first and second parameters from a user.

4. The method of claim 3, wherein the at least first and second parameters are received from the user via a graphical user interface operated by the user.

5. The method of claim 2, wherein:
   the text shown in the original state is shown in a first color;
   the at least one completed revision to the original text is shown in a second color that is different from the first color;
   the at least one completed revision to the original text is shown in the second color in an intensity that varies depending upon how recently the at least one completed revision to the original text had been made;

a first entry of the respective plurality of entries of the heat map table of contents is coded using the first color; and
a second entry of the respective plurality of entries of the heat map table of contents is coded using the second color.

6. The method of claim 2, wherein:
the text shown in the original state is shown in a font having a first weight;
the at least one completed revision to the original text is shown in the font having a second weight that is different from the first weight; and
the second weight is varied depending upon how recently the at least one completed revision to the original text had been made;
a first entry of the respective plurality of entries of the heat map table of contents is coded using the first weight; and
a second entry of the respective plurality of entries of the heat map table of contents is coded using the second weight.

7. The method of claim 2, wherein:
the text shown in the original state is shown in a font having no emphasis;
the at least one completed revision to the original text is shown in the font having an emphasis;
the emphasis is varied depending upon how recently the at least one completed revision to the original text had been made;
a first entry of the respective plurality of entries of the heat map table of contents is coded using the font having the emphasis; and
a second entry of the respective plurality of entries of the heat map table of contents is coded using the font having no emphasis.

8. A computer readable storage medium, tangibly embodying a program of instructions executable by the computer for visually showing how recently a change was made to text in a document, the program of instructions, when executing, performing the following steps:
receiving, by a processor, a first parameter indicating a user-adjustable base point of time, wherein the base point of time is adjustable among a value indicating current time and a plurality of values indicating times before the current time;
receiving, by a processor, a second parameter indicating a time span;
receiving at least one completed revision to the text that was made prior to the current time indicated by the value and prior to the user-adjustable base point of time indicated by the first parameter;
receiving the value indicating current time; and
showing visual indication of the at least one completed revision to the text starting from the current time for a duration indicated by the time span of the second parameter, wherein completed revisions made after the base point of time, and prior to the current time, will not be shown, and the at least one completed revision made prior to the base point of time will be shown, using the visual indication, within the time span, the visual indication of the at least one completed revision to the text is based upon the current time, the first parameter and the second parameter; and
generating a heat map table of contents for the document, the heat map table of contents comprising a respective plurality of entries each associated with a corresponding section of text from the document, at least one entry of the respective plurality of entries being coded based upon a most recent time at which any completed revision of the at least one completed revision was made within the corresponding section of text.

9. The computer readable storage medium of claim 8, wherein the program of instructions, when executing, further performs showing the text in an original state, wherein the text is shown in the original state prior to the showing of the visual indication of the at least one completed revision to the text.

10. The computer readable storage medium of claim 8, wherein the program of instructions, when executing, further performs receiving at least the first and second parameters from a user.

11. The computer readable storage medium of claim 10, wherein the at least first and second parameters are received from the user via a graphical user interface operated by the user.

12. The computer readable storage medium of claim 9, wherein:
the text shown in the original state is shown in a first color;
the at least one completed revision to the original text is shown in a second color that is different from the first color;
the at least one completed revision to the original text is shown in the second color in an intensity that varies depending upon how recently the at least one completed revision to the original text had been made;
a first entry of the respective plurality of entries of the heat map table of contents is coded using the first color; and
a second entry of the respective plurality of entries of the heat map table of contents is coded using the second color.

13. The computer readable storage medium of claim 9, wherein:
the text shown in the original state is shown in a font having a first weight;
the at least one completed revision to the original text is shown in the font having a second weight that is different from the first weight;
the second weight is varied depending upon how recently the at least one completed revision to the original text had been made;
a first entry of the respective plurality of entries of the heat map table of contents is coded using the first weight; and
a second entry of the respective plurality of entries of the heat map table of contents is coded using the second weight.

14. The computer readable storage medium of claim 9, wherein:
the text shown in the original state is shown in a font having no emphasis;
the at least one completed revision to the original text is shown in the font having an emphasis; and
the emphasis is varied depending upon how recently the at least one completed revision to the original text had been made;
a first entry of the respective plurality of entries of the heat map table of contents is coded using the font having the emphasis; and
a second entry of the respective plurality of entries of the heat map table of contents is coded using the font having no emphasis.

15. A computer-implemented system for visually showing how recently a change was made to text in a document, the system comprising:

a processor; and a memory storing computer readable instructions that, when executed by the processor, implement:

a first receiving element configured to receive:
- a first parameter indicating a user-adjustable base point of time, wherein the base point of time is adjustable among a value indicating current time and a plurality of values indicating times before the current time;
- a second parameter indicating a time span;

a second receiving element configured to receive at least one completed revision to the text, wherein the at least one completed revision was made prior to the current time indicated by the value and prior to the user-adjustable base point of time indicated by the first parameter;

a third receiving element configured to receive the value indicating current time; and a showing element configured to show visual indication of the at least one completed revision to the text starting from the current time for a duration indicated by the time span of the second parameter, wherein completed revisions made after the base point of time, and prior to the current time, will not be shown, and the at least one completed revision made prior to the base point of time will be shown, using the visual indication, within the time span, the visual indication of the at least one completed revision to the text is based upon the current time, the first parameter and the second parameter; and a generating element configured for generating a heat map table of contents for the document, the heat map table of contents comprising a respective plurality of entries each associated with a corresponding section of text from the document, at least one entry of the respective plurality of entries being coded based upon a most recent time at which any completed revision of the at least one completed revision was made within the corresponding section of text.

16. The system of claim 15, wherein the computer readable instructions, when executed by the processor, implement showing the text in an original state, wherein the text is shown in the original state prior to the showing of the visual indication of the at least one completed revision to the text.

17. The system of claim 15, wherein the computer readable instructions, when executed by the processor, implement receiving at least the first and second parameters from a user, wherein the at least first and second parameters are received from the user via a graphical user interface operated by the user.

18. The system of claim 16, wherein:
the text shown in the original state is shown in a first color;
the at least one completed revision to the original text is shown in a second color that is different from the first color; and
the at least one completed revision to the original text is shown in the second color in an intensity that varies depending upon how recently the at least one completed revision to the original text had been made;
a first entry of the respective plurality of entries of the heat map table of contents is coded using the first color; and
a second entry of the respective plurality of entries of the heat map table of contents is coded using the second color.

19. The system of claim 16, wherein:
the text shown in the original state is shown in a font having a first weight;
the at least one completed revision to the original text is shown in the font having a second weight that is different from the first weight; and
the second weight is varied depending upon how recently the at least one completed revision to the original text had been made;
a first entry of the respective plurality of entries of the heat map table of contents is coded using the first weight; and
a second entry of the respective plurality of entries of the heat map table of contents is coded using the second weight.

20. The system of claim 16, wherein:
the text shown in the original state is shown in a font having no emphasis;
the at least one completed revision to the original text is shown in the font having an emphasis;
the emphasis is varied depending upon how recently the at least one completed revision to the original text had been made;
a first entry of the respective plurality of entries of the heat map table of contents is coded using the font having the emphasis; and
a second entry of the respective plurality of entries of the heat map table of contents is coded using the font having no emphasis.

* * * * *